Figure 1:
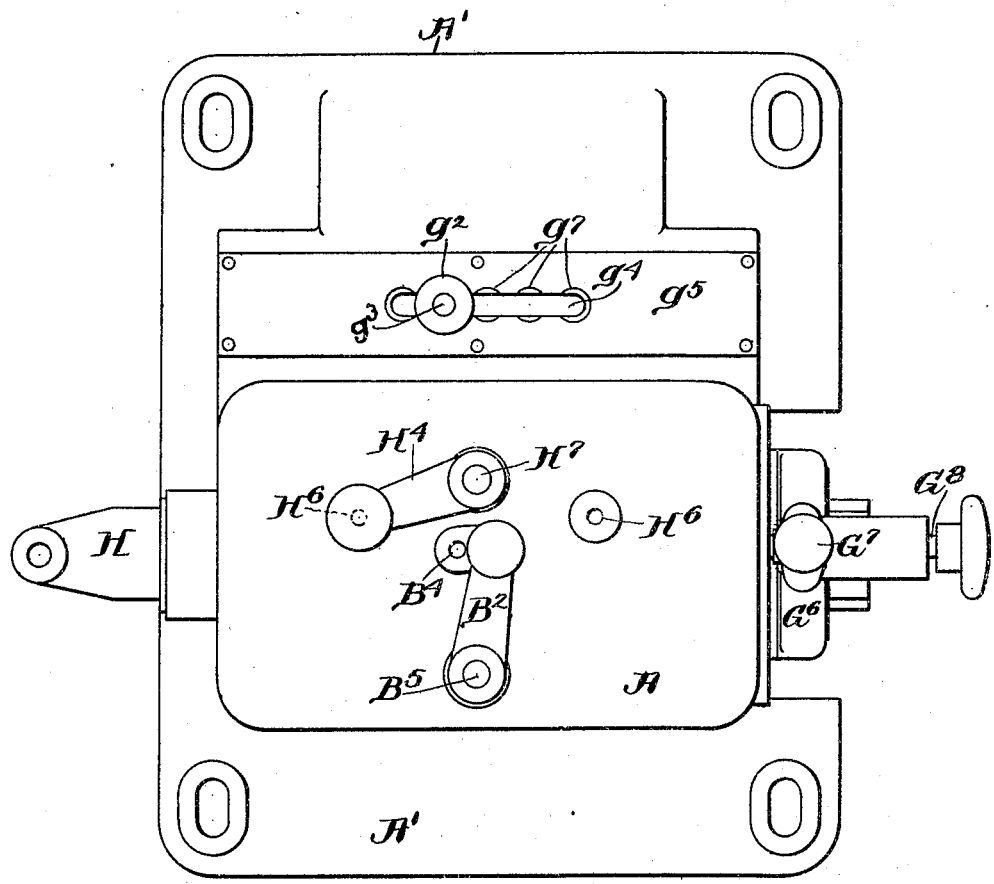

No. 794,464. PATENTED JULY 11, 1905.
J. PARKER.
VARIABLE SPEED MECHANISM.
APPLICATION FILED FEB. 5, 1904.

3 SHEETS—SHEET 1.

Witnesses:
James H. Thurston
Catherine G. Bradley

Inventor:
John Parker,
by Wilmarth H. Thurston
Attorney.

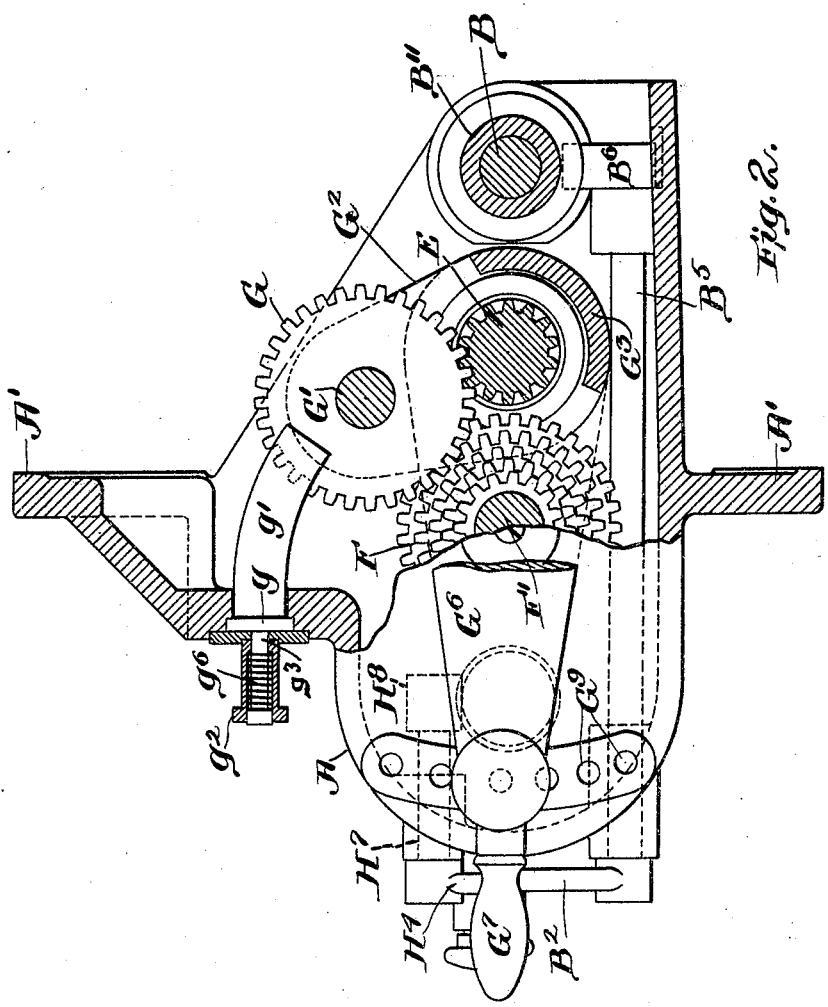

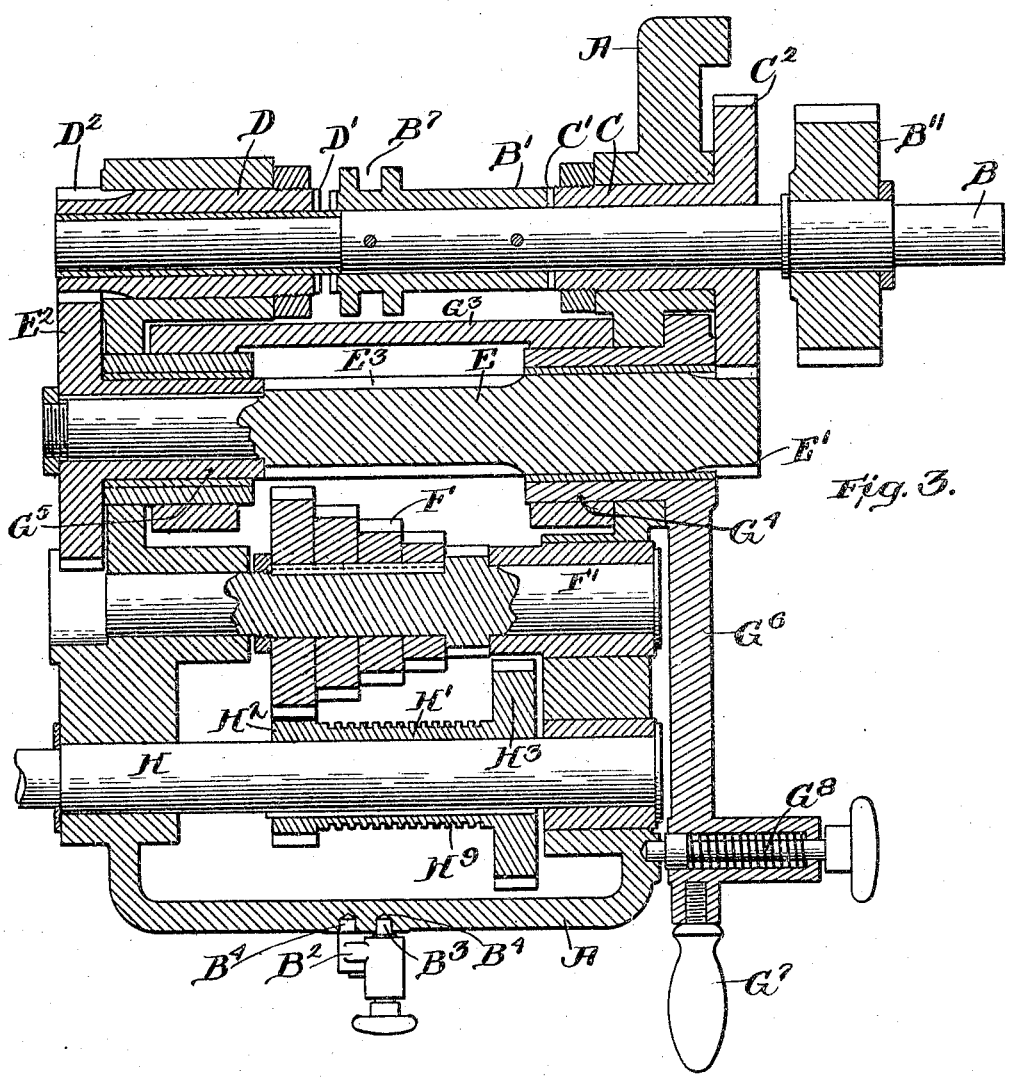

No. 794,464. Patented July 11, 1905.

UNITED STATES PATENT OFFICE.

JOHN PARKER, OF PROVIDENCE, RHODE ISLAND, ASSIGNOR TO BROWN AND SHARPE MANUFACTURING COMPANY, OF PROVIDENCE, RHODE ISLAND, A CORPORATION OF RHODE ISLAND.

VARIABLE-SPEED MECHANISM.

SPECIFICATION forming part of Letters Patent No. 794,464, dated July 11, 1905.

Application filed February 5, 1904. Serial No. 192,233.

*To all whom it may concern:*

Be it known that I, JOHN PARKER, of the city and county of Providence and State of Rhode Island, have invented certain new and useful Improvements in Variable-Speed Mechanisms; and I do hereby declare the following specification, taken in connection with the accompanying drawings, forming a part of the same, to be a full, clear, and exact description thereof.

The invention relates to variable-speed mechanism, and may be employed in various machines wherein it may be desirable to vary the speed or relative movement of the parts when using the machine under varying conditions.

The various features and combinations constituting the invention will be explained in connection with the detailed description of the mechanism shown in the accompanying drawings, which embodies these features and combinations, and will be set forth in the claims.

In the accompanying drawings, Figure 1 is a front elevation of a box or casing containing the parts of a variable-speed mechanism embodying the features of the invention in their preferred forms. Fig. 2 is a side elevation looking toward the left in Fig. 1, parts being broken away to more clearly show the construction; and Fig. 3 is a horizontal section on a horizontal line passing through the axes of the shafts B and E, Fig. 2.

As shown in the drawings, the various parts of the mechanism are supported by or contained in a casing A, which is provided with projecting plates A' for securing the mechanism to the frame of the machine in which it is to be used. Motion is imparted to the gearing included in the mechanism through a shaft B, provided with a gear B'', by which the shaft may be connected with any suitable source of power. The shaft B is provided with a clutch B', which is secured to the shaft and is arranged between two clutch members C' D'. The clutch member C' is formed on the inner end of a sleeve C, mounted in the casing A, on the outer end of which is formed a gear $C^2$. The clutch member D' is formed on the inner end of a sleeve D, on the outer end of which is formed a pinion $D^2$.

The sleeves C D surround the shaft B and form the bearings in which the shaft is free to revolve or to move longitudinally. The gear $C^2$ engages a pinion E', formed on the end of a shaft E, while the pinion $D^2$ engages a gear $E^2$, secured to the opposite end of the shaft E. When the clutch B' is in engagement with the clutch member C', the shaft E is driven, through the gear $C^2$ and pinion E', at a comparatively high rate of speed, the pinion $D^2$ and sleeve D rotating idly at such time. When the clutch B' is in engagement with the clutch member D', the shaft E is driven at a comparatively slow rate of speed through the pinion $D^2$ and gear $E^2$, the gear $C^2$ and sleeve C rotating idly at such time. By shifting the clutch B' therefore from one clutch member to the other the shaft E may be driven at a high or low rate of speed.

The clutch B' may be shifted from one clutch member to the other by the movement of an arm $B^2$, conveniently arranged at the front of the casing A and provided with a spring locking-pin $B^3$, which engages one or the other of holes $B^4$, according to the position of the clutch B'. This arm $B^2$ is connected to the front end of a shaft $B^5$, the rear end of which carries an arm $B^6$, arranged to engage an annular groove $B^7$ in the clutch B'. By reason of these connections between the arm $B^2$ and the clutch B' the movement of the arm into the position indicated in Figs. 1 and 3 will engage the clutch B' with the clutch member C', while a movement of the arm into such position that the locking-pin $B^3$ will engage the hole $B^4$ at the left will engage the clutch B' with the clutch member D'.

Motion may be transmitted from the shaft E to any one of a series of gears F of different diameters through an intermediate gear G, which engages an elongated pinion $E^3$, formed on the shaft E, and is also arranged to be engaged with any one of the gears F. The intermediate gear G is mounted to slide upon a shaft G', carried in the arms $G^2$ of a frame $G^3$. The frame $G^3$ is secured to sleeves $G^4$ $G^5$, which surround the shaft E and form the bearings within which said shaft rotates. By rocking the sleeve $G^4$ and the connected frame $G^3$ the gear G may be moved about the pinion $E^3$ to vary the distance between the axis of the gears F and the axis of the gear G, so that the gear G may be engaged with any one of the gears F. The rocking movement may be imparted to the frame $G^3$ by an arm $G^6$ on the outer end of the sleeve $G^4$, which extends toward the front of the casing and is provided with a handle $G^7$, by which it may be conveniently operated. The arm $G^6$ is held in any of its adjusted positions by a spring-operated locking-bolt $G^8$, mounted in the arm and arranged to engage any one of a series of locking-holes $G^9$, formed on the side of the casing. There are five gears F in the cone-gear, and there are six locking-holes $G^9$, five of which correspond to the positions of the gear G when in engagement with the different gears of the cone-gear, the other locking-hole corresponding to the position of the gear G when it is thrown back to prevent its engagement with any of the gears of the cone-gear.

The gear G is moved laterally on the shaft $G'$ to bring it into register with the proper gear F of the cone-gear by the movement of a slide $g$, mounted in the front of the casing and provided with rearwardly-extending arms $g'$, lying on opposite sides of the gear G. The slide $g$ may be moved to bring the gear G into proper position by means of a handle $g^2$, mounted upon the stud $g^3$, which projects from the slide $g$ through a slot $g^4$ in a locking-plate $g^5$. The handle $g^2$ is forced yieldingly toward the plate $g^5$ by a spring $g^6$, and when the gear G is in register with a gear F the inner end of the handle $g^2$ engages one of a series of recesses $g^7$ in the plate $g^5$ and holds the gear from lateral displacement. By withdrawing the handle $g^2$ from the locking-recess and moving it laterally the gear G may be brought into position to engage any one of the gears F of the cone-gear.

As there are five gears in the cone-gear, this gear may be driven at five different speeds without changing the speed of the shaft E, and since the shaft E may be driven at two different speeds the mechanism thus far described provides for ten variations in the speed of the cone-gear F or the shaft $F'$, to which it is secured.

Motion is transmitted from the cone-gear to a shaft H through a quill-gear $H'$. The quill-gear is so arranged that the small gear $H^2$ may be brought into engagement with the largest gear of the cone-gear, while the large gear $H^3$ of the quill-gear may be brought into engagement with one of the smaller gears of the cone-gear. The quill-gear is connected with the shaft H by a key-and-slot connection, which allows the gear to be moved longitudinally on the shaft to bring either the small gear $H^2$ or the large gear $H^3$ into engagement with the cone-gear. This longitudinal movement is imparted to the quill-gear by the movement of an arm $H^4$, conveniently arranged at the front of the casing and carrying a spring locking-pin similar to the pin $B^3$, which may be engaged in either of two locking-holes $H^6$, formed in the casing. This arm $H^4$ is secured to the outer end of a rock-shaft $H^7$, the inner end of which carries a pinion $H^8$, engaging annular teeth $H^9$, formed on the sleeve of the quill-gear. When the locking-pin $H^5$ is in the position indicated in Fig. 1, the small gear $H^2$ is in engagement with a gear of the cone-gear. By swinging the arm from this position into the position where the pin $H^5$ will engage the hole $H^6$ at the right in Fig. 1 the quill-gear will be moved longitudinally to the left in Fig. 3, thus disengaging the gear $H^2$ and bringing the gear $H^3$ into engagement with the second gear F of the cone-gear. By thus arranging the quill-gear to engage different gears in the cone-gear a simple construction is provided without the use of additional gears for coöperating with the quill-gear. The introduction of the quill-gear between the cone-gear and the shaft H enables the shaft H to be given either of two speeds for each speed of the cone-gear, and since the cone-gear may be driven at any one of ten different speeds it follows that the shaft H may be given any one of twenty different speeds.

The construction and arrangement above described provide a simple and compact variable-speed mechanism by which a large number of different speeds may be obtained and in which the devices for adjusting the parts for different speeds are conveniently located and arranged so that the changes may be readily and quickly made.

While in describing the mechanism shown the shaft B has been referred to as the "driving-shaft," it will be understood that power may be applied to either the shaft B or the shaft H and that either shaft may be the driving and either the driven shaft of the mechanism.

What I claim, and desire to secure by Letters Patent, is—

1. The combination of a shaft E, a gear $E^3$ thereon, a cone-gear, an intermediate gear engaging gear $E^3$, a frame supporting said gear, a sleeve surrounding shaft E to which said frame is secured, an operating-arm on the outer end of the sleeve, means for locking the arm in adjusted positions, and means for moving the gear laterally on the frame and holding it in adjusted position, substantially as described.

2. The combination of a shaft E, a gear $E^3$ thereon, a cone-gear, an adjustable intermediate gear for connecting gear $E^3$ with any one of the cone-gears, gears $E'$ and $E^2$ on the shaft E, a second shaft B, gears $C^2$, $D^2$, engaging gears $E'$, $E^2$ respectively, and means for connecting either gear $C^2$ or $D^2$ to the shaft B, substantially as described.

3. The combination of a shaft E, a gear $E^3$ thereon, a cone-gear, an adjustable intermediate gear for connecting gear $E^3$ with any one of the cone-gears, gears $E'$ and $E^2$ on the shaft E, a second shaft B, gears $C^2$, $D^2$ engaging gears $E'$, $E^2$, respectively, a clutch $B'$ on the shaft B and devices for shifting the clutch to connect either gear $C^2$ or gear $D^2$ with shaft B, substantially as described.

4. The combination of a shaft B, gears $C^2$ and $D^2$ on the shaft, a clutch $B'$ for connecting either gear to the shaft, a shaft E, gears $E'$ and $E^2$ secured thereto and engaging gear $C^2$ and $D^2$ respectively, a gear $E^3$ on shaft E, a cone-gear F, an intermediate gear G adjustable about the axis of gear E and laterally, a shaft H, and a sleeve $H'$ having gears $H^2$, $H^3$ longitudinally movable thereon, substantially as described.

5. The combination of a casing A, a shaft E mounted thereon, a gear $E^3$ on shaft E, a cone-gear F, a sleeve $G^4$ surrounding shaft E, a frame $G^3$ secured thereto, a gear G engaging gear $E^3$ and laterally adjustable on the frame, an operating-arm $G^6$ on the end of the sleeve $G^4$ outside the casing, and a locking device for holding the arm in adjusted position, substantially as described.

6. The combination of a shaft E, a gear $E^3$ on said shaft, a cone-gear F, an intermediate gear G engaging the gear $E^3$ and adjustable about the axis of said gear, a slide $g$ having arms engaging opposite sides of gear G, a locking-plate $g^5$ provided with a series of recesses, and locking devices mounted on the slide and engaging said recesses, substantially as described.

JOHN PARKER.

Witnesses:
W. H. THURSTON,
J. H. THURSTON.